Jan. 10, 1961     G. N. GAEBELEIN     2,967,999
WAVEFORM MEASURING APPARATUS
Filed Nov. 27, 1957     2 Sheets-Sheet 2
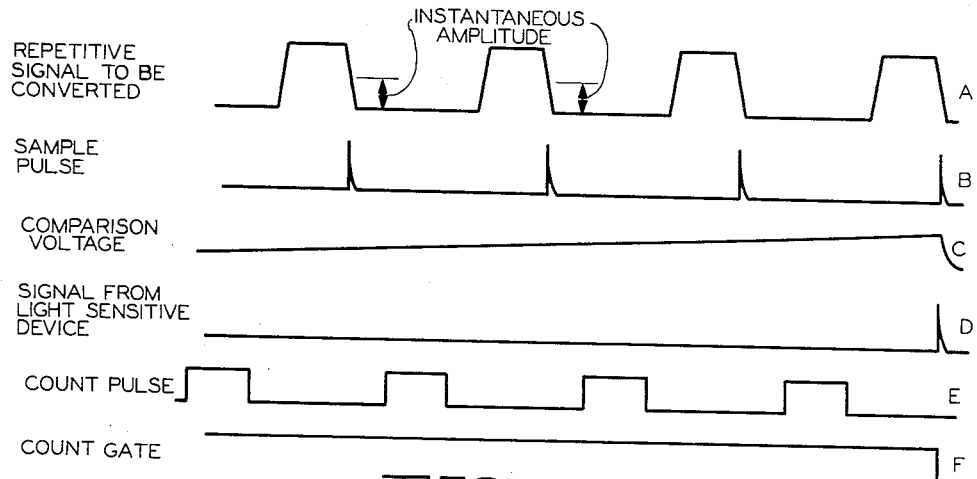
FIG_2
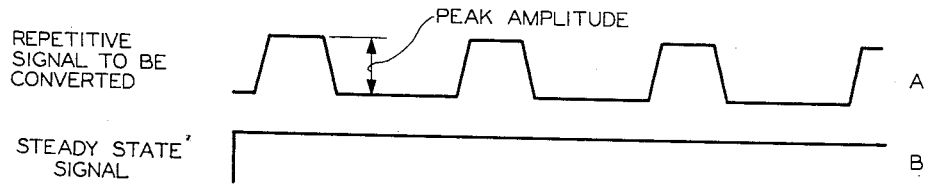
FIG_4
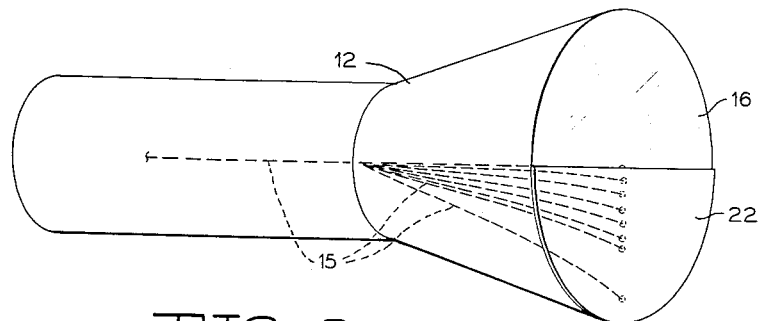
FIG_3

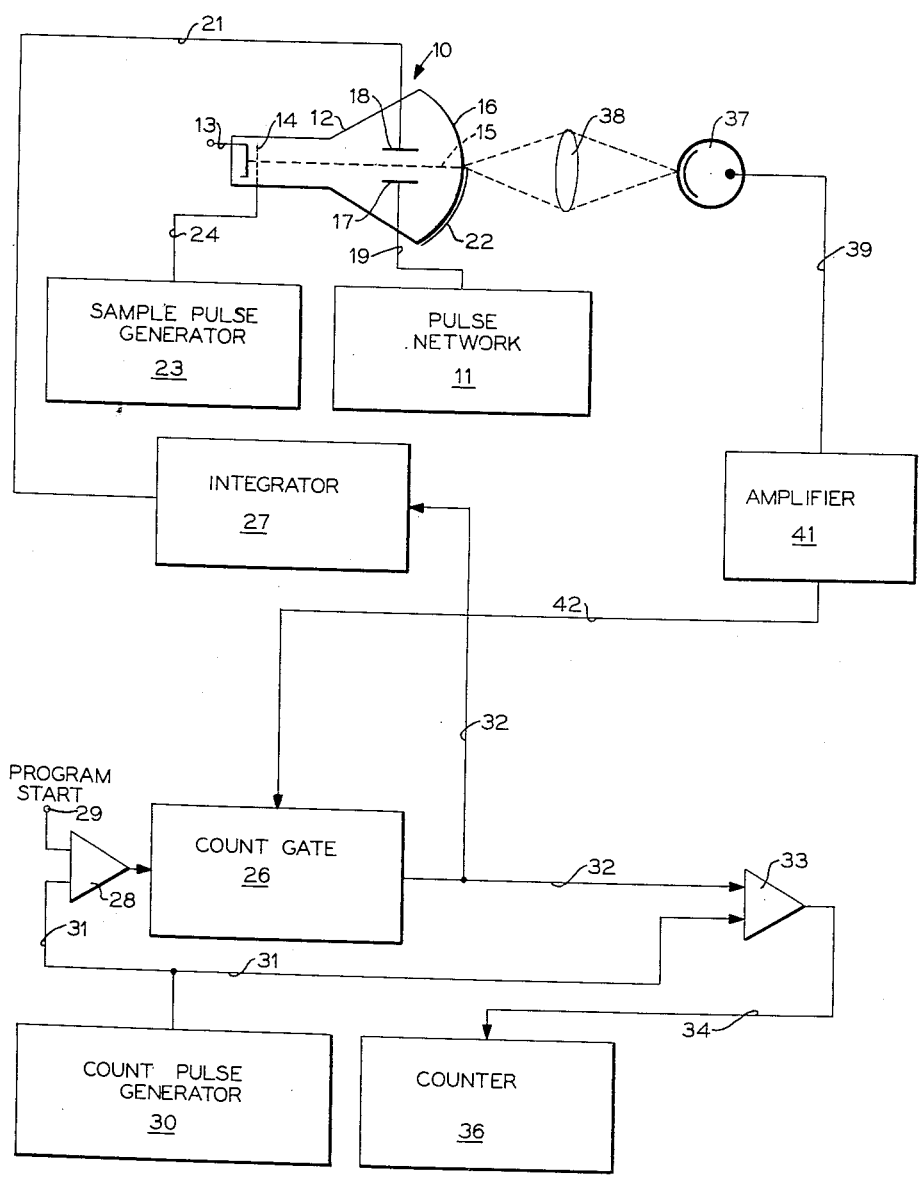

United States Patent Office 2,967,999
Patented Jan. 10, 1961

2,967,999

WAVEFORM MEASURING APPARATUS

Georg N. Gaebelein, Endicott, N.Y., assignor to International Business Machines Corporation, New York, N.Y., a corporation of New York Filed Nov. 27, 1957, Ser. No. 699,372

8 Claims. (Cl. 324—121)

This invention relates to electronic measuring means, particularly to means for converting a varying input quantity into digital form and more particularly to means for converting an analog voltage to a digital quantity.

The invention may be referred to as a quantizer since it measures a varying input quantity in discrete steps. Since the invention is capable of converting recurrent type of signals to a digital quantity, it finds great utility in testing transient responses of pulse type networks.

Accordingly, it is a principal object of this invention to provide an improved means for converting a varying quantity into digital form.

Another object of this invention is to provide a means for converting an analog voltage to a digital quantity.

Another object of this invention is to provide a means for measuring instantaneous voltages of repetitive electric signals.

Another object of this invention is to provide an improved system for measuring peak voltages of repetitive electric signals.

In general, the operation of the system involves generating a comparison voltage rising at a uniform rate with a linear function of time. The rate of rise and the total rise of the comparison voltage which is in proportion to the signal voltage being converted is related to a series of count pulses. These count pulses together with a program start signal turn on a count gate. The count gate is integrated to effect the comparison voltage and also provides the necessary signal to permit count pulses supplied to an AND switch to pass to a counter to provide a measurement of the signal voltage. An indicator capable of determining the equality in magnitude of the signal voltage and the comparison voltage emits a signal to turn off the count gate and thereby cause the AND switch to operate to terminate entry of count pulses into the counter when the said voltages are equal.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a representation of a simplified system, in block diagram, embodying the invention.

Fig. 2, portions, A, B, C, D, E and F are a representation of the wave forms involved in the operation of the system in Fig. 1.

Fig. 3 is a diagrammatical representation of the electron beam being deflected to impinge upon a fluorescent screen in various positions as the comparison voltage rises at a steady rate in discrete increments.

Fig. 4, portions A and B are representations of wave forms applied to one of the deflection plates in the modified system.

Referring now to the drawings, the invention is illustrated by way of example in Fig. 1 with the signal voltage to be converted being applied to an equality detector or coincidence indicator 10. In this instance the signal voltage to be converted, shown in Fig. 2, portion A, comes from a pulse type network 11, shown in block form, which is pulsed by a suitable clock pulse. A voltage rising with a linear function of time or comparison voltage, shown in Fig. 2, portion C, derived in a manner to be described later herein, is also applied to the coincidence indicator 10. The coincidence indicator 10 comprises a cathode ray tube 12 of the conventional type having a cathode 13, a control grid 14, a fluorescent screen 16 and spaced vertical deflecting plates 17 and 18, respectively. The signal voltage to be converted, coming from the pulse network 11, is applied over a conductor 19 to the vertical deflection plate 17 and the comparison voltage, shown in Fig. 2, portion C, is applied to the deflection plate 18 over a conductor 21. An opaque mask 22 is disposed to cover the lower half of the face or screen 16 of the tube 12.

Hence as electron beams 15 are emitted from the cathode 13, the signal voltage applied to the plate 17 will deflect the beam downward in the usual manner to impinge upon the screen 16 to produce a luminous spot on that portion of the screen 16 covered by the mask 22. The rising comparison voltage applied to the plate 18 continually counteracts the deflecting action caused by the signal voltage at plate 17 and when the comparison voltage equals the signal voltage, the electron beam 15 will impinge upon the screen 16 on the portion thereof not covered by the mask 22. This mask can be adjusted so that when the comparison voltage and the signal voltage are equal, the electron beam 15 will then appear for the first time on the unmasked portion of screen 16.

In converting repetitive signal voltages, the resultant signal appears on the screen 16 as a vertical line and hence only peak amplitudes and not instantaneous amplitude could be converted by the portion of the system so far described. However, instantaneous amplitudes of repetitive voltage signals may be converted wherein for intensity modulation, a timed sampling pulse, as shown in Fig. 2, portion B, is applied to the control grid 14 from a sample pulse generator 23 over a conductor 24, thereby representing the instantaneous amplitude of the signal voltage on the face of the screen 16 at sample time as a luminous spot. The sample pulse must always occur at the same time with respect to the repetitive signal being converted. However, the sample pulse can be made to selectively occur at any point or position with respect to the repetitive signal. In this connection, the sample pulse shown in Fig. 2, portion B, is derived by applying the above-mentioned clock pulse to a time selecting network, the details thereof are not shown, to generate the desired sample pulse. A time selecting network can be chosen whereby the sample pulse occurs at the desired point with respect to the repetitive signal and if it is desired to shift or change the point where the sample pulse occurs, the clock pulse is applied to a different portion of the network. The feature of providing for the sample pulse to selectively occur at any point with respect to the repetitive signal does not form a part of this invention and therefore, further description is not given. From the foregoing it is seen that the sample pulse is synchronized with the repetitive signal voltage to be converted by means of the clock pulse.

The comparison voltage is obtained by integrating the signal, shown in Fig. 2, portion F, from a count gate 26 by means of any suitable integrator 27. The count gate 26, shown in block form in Fig. 1, consists of any suitable bistable device, the details thereof are not shown, which is turned On by means of an impulse coming from the output of an AND switch 28 having an input impulse of a programmed start signal applied at the terminal 29 and a count pulse, shown in Fig. 2, portion E, on the conductor 31. Count pulses are generated from a count pulse generator 30 shown in block form in Fig. 1 which consists of any suitable ring type circuit, not shown, whereby the above-mentioned clock pulse triggers the same to effect the count pulses. Since the clock pulse which is utilized to synchronize the repetitive signal and the sample pulses is also used to trigger the ring circuit in the count pulse generator 30, the count pulses are synchronized with the repetitive signal and the sample pulses.

The output from the count gate 26, as shown in Fig. 2, portion F, is applied over the conductor 32 to the integrator 27 and to an AND switch 33 which also has an input of count pulses over the conductor 31. Since the count pulse is used together with the program start signal to turn On the count gate 26, it is related in time to the comparison voltage which is derived by integrating the signal from the count gate. In this manner count pulses occur in relation to the rise of the comparison voltage or in other words, the integrator 27 and count pulse generator 30 could be set for example, that the comparison voltage rises one volt as one count pulse is generated. Of course this relationship would not be true if the integrator wire defective or if the count pulses do not occur at the proper time since once a count pulse together with the program start signal turn on the count gate 26, the count pulses have no further affect on the count gate and therefore the count pulse does not exercise any control over the comparison voltage or vice versa.

The output of the switch 33 is transmitted over a conductor 34 to a suitable counter 36 to record the count pulse directed through the switch 33. Hence if the system is functioning properly, a count pulse will be gated into the counter 36 in relation to the rising comparison voltage.

As previously stated, by applying the sample pulse to the control grid 14 a luminous spot will appear on the screen to represent the selected instantaneous amplitude of the repetitive signal voltage at sample time. Furthermore, it was stated above that the mask 22 can be adjusted so that the electron beam will impinge upon the unmasked portion of screen 14 to produce a luminous spot thereon only when the comparison voltage and the instantaneous amplitude of the signal voltage are equal.

By positioning a light sensitive device 37 adjacent the screen 16, the luminous spot appearing thereon may be detected. A suitable lens 38 is located intermediate of the screen 16 and the light sensitive device 37 to focus the luminous spot thereon to activate the same to generate an electric signal in the usual manner. This signal shown in Fig. 2, portion D, is transmitted over a conductor 39 to a suitable amplifier 41 for amplification of the same and then transmitted over the conductor 42 to turn off the count gate 26 by switching the condition of the bistable device. As the count gate 26 is turned Off the voltage on the line 32 to the integrator 27 drops and thereby the comparison voltage drops. At the same time the entry of the count pulses into the counter 36 are terminated since with the voltage on the line 32 to the switch 33 dropped, count pulses will not be passed by the switch 33.

In operation of the system to measure the digital value of the instantaneous amplitude of a repetitive signal, the signal derived by applying the clock pulse to the pulse network 11 is transmitted to the deflection plate 17 to deflect the electron beam 15 emitted from the cathode 13 as the sample pulse is applied to the grid 14 over the conductor 24, to impinge upon the masked portion of the screen 16. Hence while a luminous spot will appear on the screen 16, it will not be detected at this time by the light sensitive device 37 because of the mask 22.

Since the count gate 26, at this time, is in its Off condition a comparison voltage is not available at the deflection plate 18 to counteract the deflection of the beam 15 caused by the instantaneous amplitude of the repetitive signal to be measured. However, the transmission of a programmed start signal applied at the terminal 29 and a count pulse over the conductor 31 to the AND switch 28 will operate the same to effect an output to turn On the count gate 26. At the same time the count pulse is applied to the AND switch 28, it is also applied to the AND switch 33. Hence as the count gate 26 turns On, the signal therefrom as shown in Fig. 2, portion F, will simultaneously be applied over the conductor 32 to the integrator 27 and to the AND switch 33. Accordingly, the output signal from the count gate 26 is then integrated by the integrator 27 and the count pulse will be passed by the switch 33 and transmitted over the conductor 34 to the counter 36. As the count pulse is gated into the counter 36, the integrator signal is transmitted over the conductor 21 to be applied to the deflection plate 18 to deflect or drive the electron beam 15 emitting from the cathode 13, as the sample pulse is applied to grid 14, upward toward the unmasked portion of the screen 16 to impinge thereon to produce a luminous spot. This action continues, that is, the comparison voltage rises upwardly at a uniform rate and count pulses are directed to the switch 33 in relation to the rising comparison voltage and with the count gate 26 On, these count pulses are admitted by the switch 33 into the counter 36 over the conductor 34, and the luminous spot progressively appears nearer the unmasked portion of the screen 14, as shown in Fig. 3. When the comparison voltage has risen an amount to equal the instantaneous amplitude of the repetitive signal voltage being converted or measured, the luminous spot caused by the electron beam 15 appears on the screen 16 in the unmasked portion thereof. Therefore, the light sensitive device 37 detects the luminous spot as the lens 38 focuses the same thereon and accordingly, generates a signal which is applied to the amplifier 41 whose output is conducted over the line 42 to be applied to the count gate 26 to turn the same Off. With the count gate 26 turned Off, the voltage on the conductor 32 drops and therefore further count pulses are blocked by the AND switch 33 to terminate entry of count pulses into the counter 36. Also, the comparison voltage on the conductor 21 will be turned Off or dropped because the voltage on the conductor 32 to the integrator 27 had been dropped as the count gate 26 was turned Off. Hence a digital value of the instantaneous voltage amplitude of the signal being measured is contained in the counter. Further cycles of operation could be started by applying program start signals to the terminal 29.

The peak voltage of the repetitive electric signal as in Fig. 4, portion A, or a steady state electric signal as in Fig. 4, portion B, may easily be measured by modifying the system mentioned above whereby a voltage is applied to constantly bias the grid 14 of the cathode ray tube 12. In this instance, the rest of the system operates in the same manner described above. The repetitive electric signal shown in Fig. 4, portion A, would be applied over the conductor 19 to be transmitted to the deflection plate 17 to deflect the electron beam emitting from the cathode 13 to appear on the masked portion of the screen 16 as a luminous vertical line. As the comparison voltage rises, this luminous line would shift to approach the unmasked portion of the screen 16. When the comparison voltage equals the peak voltage of the repetitive signal, the luminous line would appear on the unmasked portion of the screen 16 to activate the light sensitive device 37 and thereby generate a signal to turn Off the count gate 26. Of course, this action would terminate the entry of count pulses into the counter 36. A steady state electric signal as in Fig. 4, portion B, is measured in a similar manner, that is, it is applied over the conductor 19 to be transmitted to deflection plate 17, to deflect the electron beam emitting from the cathode 13, to appear on the masked portion of the screen 16 as a luminous spot. Again, as the rising comparison voltage is applied to the deflection plate 18, the luminous spot shifts upward toward the unmasked portion of the screen 16 and when the comparison voltage equals the signal, the luminous spot appears on the unmasked portion of the screen 16 to activate the light sensitive device 37 to generate a signal which is then transmitted to turn Off the count gate 26 and thereby terminate entry of count pulses into the counter 36.

From the foregoing, it is seen that the invention provides means for measuring in digital form instantaneous amplitudes of repetitive signals. Further, by using a proper time selecting network for generating the sample pulse, instantaneous voltages of high frequency signals may be measured as a digital quantity. It is also seen that the system is adaptable to measure peak voltages of repetitive electric signals and the amplitudes of steady state electric signals.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A device for measuring an instantaneous amplitude of a repetitive signal voltage comprising sample pulse generating means to provide a series of pulses occurring at predetermined time intervals with respect to said repetitive signal voltage, means for generating a series of count pulses occurring in timed relationship with respect to said sample pulses, a cathode ray tube having a screen, deflection plates and a control grid, means for masking a portion of said screen, means for applying said sample pulses to said grid to bias the same to permit an electron beam to impinge upon said screen, means for applying said repetitive signal voltage to at least one of said deflection plates to deflect the electron beam to impinge upon the masked portion of said screen, a comparison voltage generating means for providing a linear comparison voltage rising at a known rate wherein the voltage begins to rise at a predetermined time, means for applying said comparison voltage to another of said deflection plates to counteract the deflection caused by said repetitive voltage signal, a counter, means for applying count pulses to said counter starting at the time the comparison voltage begins to rise, and means operable in response to said electron beam impinging upon said unmasked portion of the screen to terminate the entry of count pulses into said counter.

2. In a device for measuring an instantaneous amplitude of a repetitive signal voltage comprising a cathode ray tube having a screen, deflection plates and a control grid, sample pulse generating means for providing a series of pulses occurring at predetermined time intervals with respect to said repetitive signal voltage, means for applying said sample pulses to said grid to bias the same to permit an electron beam to impinge upon said screen to produce a luminous spot thereon, means for masking a portion of said screen, means for applying said repetitive voltage signal to one of said deflection plates to deflect the electron beam to impinge upon the masked portion of the screen, comparison voltage generating means for providing a linear comparison voltage rising at a known rate and wherein said voltage begins to rise at a predetermined time, means for applying said comparison voltage to another of said deflection plates to counteract the deflection caused by said repetitive signal voltage whereby said electron beam is caused to impinge upon the unmasked portion of the screen when the comparison voltage and the instantaneous amplitude of the repetitive signal voltage are equal, means for generating a series of count pulses occurring in a timed relationship with respect ot said sample pulses, a counter, means for gating said count pulses into said counter beginning at the time comparison voltage begins to rise, a light sensitive device positioned adjacent said screen and operative by said luminous spot appearing on the unmasked portion thereof to generate a signal, and means for applying the signal generated by said light sensitive device to said gating means to terminate the entry of count pulses into said counter.

3. In a device for measuring an instantaneous amplitude of a repetitive signal voltage comprising count pulse generating means for providing count pulses occurring at predetermined time intervals with respect to said repetitive signal, a count gate having two conditions, a first switch operably connected to said count gate to cause the same to assume one of said two conditions, means for applying count pulses to said first switch, means for applying a program start signal to said first switch to operate the same upon a count pulse also being applied to said first switch, integrating means connected to said gate and operable upon said gate being in said one of said two conditions to provide a linear comparison voltage rising at a uniform rate, a cathode ray tube having a screen, a pair of deflection plates and a control grid, means for applying sample pulses to said control grid to bias the same to permit an electron beam to impinge upon said screen to produce a luminous spot thereon at intervals with respect to an instantaneous amplitude of said repetitive signal, means for masking a portion of said screen, means for applying said repetitive signal to one of said deflection plates to deflect the electron beam to impinge upon the masked portion of the screen, means for applying the comparison voltage to the other of said deflection plates to counteract the deflection caused by said repetitive signal voltage whereby said electron beam is caused to impinge upon the unmasked portion of said screen when the instantaneous amplitude of the repetitive signal and the comparison voltage are equal, a light sensitive device positioned adjacent said screen and operable to generate a signal as said luminous spot appears on the unmasked portion of said screen, means for applying said signal generated by said light sensitive device to said gate to cause the same to assume the other of said two conditions, means for counting said count pulses, and a second switch having inputs from said gate and from said count pulse generating means and an output to said counting means and operable upon receiving a count pulse with said gate being in said one of said two conditions to pass count pulses to said counting means and to block count pulses to said counting means upon operating said gate to assume the other of said two conditions.

4. In a device for measuring an instantaneous amplitude of a repetitive signal voltage comprising a cathode ray tube having a screen, a pair of deflection plates and a control grid, means for masking a portion of said screen, means for applying sample pulses to said control grid to bias the same to cause an electron beam to impinge upon said screen at corresponding intervals with respect to an instantaneous amplitude of said repetitive signal, means for applying said repetitive signal voltage to one of said deflection plates to deflect the electron beam as the grid is biased to impinge upon the masked portion of said screen, comparison voltage generating means for providing a linear comparison voltage rising at a uniform rate and at a predetermined time, means for applying said comparison voltage to the other of said deflection plates to counteract the deflection caused by said repetitive signal whereby said electron beam is caused to impinge upon the unmasked portion of said screen when the instantaneous amplitude of the repetitive signal and the comparison voltage are equal, detecting means operable to produce a signal in response to said electron beam impinging upon the unmasked portion of said screen, counting means, and means for applying count pulses occurring at predetermined time intervals with respect to said repetitive signal and said comparison voltage to said counting means and connected to be operable in response to said comparison voltage rising and inoperable in response to the signal produced by said detecting means.

5. In a device for measuring an instantaneous amplitude of a repetitive signal comprising a cathode ray tube having a screen, a pair of deflection plates and a control grid, means for masking a portion of said screen, means for applying sample pulses occurring at intervals corresponding to the occurrences of an instantaneous amplitude of said repetitive signal to said control grid to bias the same to permit an electron beam to impinge upon said screen to produce a luminous spot thereon, means for applying said repetitive signal to one of said deflection plates to deflect an electron beam emitted as the grid is biased to impinge upon the masked portion of said screen, comparison voltage generating means for generating a linear comparison voltage rising at a uniform rate and at a predetermined time, means for applying said comparison voltage to the other of said deflection plates to counteract the deflection caused by said repetitive voltage signal, whereby said electron beam is caused to impinge upon the unmasked portion of said screen when the instantaneous amplitude of the repetitive signal and the comparison voltage are equal, a light sensitive device positioned adjacent said screen and operative to produce a signal in response to said luminous spot appearing on the unmasked portion of the screen, means for applying said signal produced by the light sensitive device to said comparison voltage generating means to terminate the operation of the same, counting means, means for applying count pulses occurring at predetermined time intervals with respect to said repetitive signal and said comparison voltage to said counting means and connected to be operative in response to said comparison voltage rising and inoperative in response to said light sensitive device producing a signal.

6. A device for measuring the peak amplitude of a repetitive signal comprising a cathode ray tube having a screen, a grid and a pair of deflection plates wherein said grid is biased to permit an electron beam to impinge upon said screen, means for masking a portion of said screen, means for applying said repetitive signal to one of said deflection plates to deflect the electron beam to impinge upon the masked portion of said screen, comparison voltage generating means for providing a linear comparison voltage rising at a uniform rate and at a predetermined time, means for applying said comparison voltage to the other of said deflection plates to counteract the deflection caused by said repetitive signal whereby said electron beam is caused to impinge upon the unmasked portion of the screen when the peak amplitude of the repetitive signal and the comparison voltage are equal, detecting means operative to generate a signal upon said electron beam impinging upon the unmasked portion of the screen, means for applying said signal generated by said detecting means to said comparison voltage generating means to render the same inoperative, counting means, and means for applying count pulses occurring at predetermined time intervals with respect to said repetitive signal and said comparison voltage to said counting means and connected to be operative as said comparison voltage rises and inoperative upon said detecting means generating a signal.

7. A device for measuring the peak amplitude of a repetitive signal comprising a cathode ray tube having a screen, a grid, and a pair of deflection plates wherein said grid is biased to permit an electron beam to impinge upon said screen to produce a luminous spot thereon, means for masking a portion of said screen, means for applying said repetitive signal to one of said deflection plates to deflect the electron beam to impinge upon the masked portion of said screen, comparison voltage generating means for providing a linear comparison voltage rising at a uniform rate and at a predetermined time, means for applying said comparison voltage to the other of said deflection plates to counteract the deflection caused by said repetitive signal whereby said electron beam is caused to impinge upon the unmasked portion of the screen when the voltages are equal, a light sensitive device positioned adjacent said screen and operative to generate a signal in response to said electron beam impinging upon the unmasked portion of the screen, means for applying said signal generated by said light sensitive device to said comparison voltage generating means to render the same inoperative, counting means, and means for applying count pulses occurring at predetermined time intervals with respect to said repetitive signal and said comparison voltage to said counting means and connected to be operative by said comparison voltage rising and inoperative upon said detecting means generating a signal.

8. In a device for measuring an instantaneous amplitude of a repetitive voltage comprising a count gate having stable "on" and "off" states; a first switch connected to control the turning "on" of said count gate; a count pulse generator for generating a series of count pulses; an electrical connection from said count pulse generator to said first switch to condition the same upon the presence of each count pulse applied thereto; means for operating said first switch to cause the turning "on" of said count gate when said first switch is conditioned by said count pulses; a counter for counting said count pulses; a second switch having an output connection to control the entry of count pulses into said counter, and input connections from said count pulse generator and said count gate whereby said second switch is rendered operable to permit entry of count pulses into said counter upon the application of count pulses with the count gate in the "on" state and to prevent entry of count pulses into said counter with the count gate in the "off" state; an integrator connected to integrate the steady state output of the count gate to derive a linear comparison voltage rising directly proportional with time; and an equality detector having an input connection from said integrator and from said repetitive voltage and an output connection to said count gate to turn the same "off" when the comparison voltage derived by the integrator equals the instantaneous amplitude of the repetitive voltage.

References Cited in the file of this patent

UNITED STATES PATENTS

| | | |
|---|---|---|
| 2,717,994 | Dickinson et al. | Sept. 13, 1955 |
| 2,733,358 | Carapellotti | Jan. 31, 1956 |
| 2,761,968 | Kuder | Sept. 4, 1956 |
| 2,824,285 | Hunt | Feb. 18, 1958 |